(12) United States Patent
Monnerat

(10) Patent No.: US 10,778,569 B2
(45) Date of Patent: Sep. 15, 2020

(54) METHODS AND SYSTEMS FOR PROVIDING ALTERNATE CONTENT

(71) Applicant: Comcast Cable Communications, LLC, Philadelphia, PA (US)

(72) Inventor: Edward David Monnerat, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/060,070

(22) Filed: Mar. 3, 2016

(65) Prior Publication Data

US 2017/0257261 A1  Sep. 7, 2017

(51) Int. Cl.
| | | |
|---|---|---|
| *H04W 24/04* | (2009.01) | |
| *H04L 12/703* | (2013.01) | |
| *H04L 12/24* | (2006.01) | |
| *H04L 12/707* | (2013.01) | |

(52) U.S. Cl.
CPC .......... *H04L 45/28* (2013.01); *H04L 41/0659* (2013.01); *H04L 45/22* (2013.01); *H04W 24/04* (2013.01)

(58) Field of Classification Search
CPC ..................................................... H04L 12/24
See application file for complete search history.

(56) References Cited

U.S. PATENT DOCUMENTS

| | | | |
|---|---|---|---|
| 8,326,967 B2 | 12/2012 | Sherer et al. | |
| 8,717,870 B2 | 5/2014 | Howlett et al. | |
| 2003/0142670 A1 | 7/2003 | Gould et al. | |
| 2004/0116125 A1 | 6/2004 | Terry | |
| 2006/0120523 A1* | 6/2006 | Kurotaki | H04N 21/43853 380/201 |
| 2007/0002190 A1* | 1/2007 | Maehata | H04B 7/0814 348/837 |
| 2010/0036963 A1 | 2/2010 | Gahm et al. | |
| 2011/0306313 A1* | 12/2011 | Jaisimha | H03J 7/183 455/185.1 |
| 2012/0002115 A1* | 1/2012 | Stevens | H04N 21/42202 348/731 |
| 2016/0294421 A1* | 10/2016 | Preteseille | H04H 20/22 |

* cited by examiner

*Primary Examiner* — Sulaiman Nooristany
(74) *Attorney, Agent, or Firm* — Ballard Spahr LLP

(57) ABSTRACT

Methods and systems for providing alternate content are disclosed. An example method can comprise determining a failure condition of a content stream. A channel identifier can be determined for the content stream, and alternate content streams associated with the channel identifier can be determined. The alternate content streams can be accessible via a different protocol, frequency, or network path than the content stream. For example, the alternate content streams can be accessible via a packet-switched network path instead a non-packet-switched network path used to access the content stream.

20 Claims, 7 Drawing Sheets

| Virtual Channel (304) | Frequency (306) | MPEG (308) | Channel Identifier (310) |
|---|---|---|---|
| ... | ... | ... | ... |
| ... | ... | ... | ... |
| ... (302) | ... | ... | ... |
| 805 | 725.25 | 6 | 12345 |
| 806 | 645.75 | 2 | 10101 |
| ... | ... | ... | ... |
| ... | ... | ... | ... |
| ... | ... | ... | ... |

| Virtual Channel (304) | Resource Identifier (314) | Channel Identifier (310) |
|---|---|---|
| ... | ... | ... |
| ... | ... | ... |
| ... (312) | ... | ... |
| 805 | Http://mycdn/video/.../xy | 12345 |
| 806 | Http://mycdn/video/.../xyz | 10101 |
| ... | ... | ... |
| ... | ... | ... |
| ... | ... | ... |

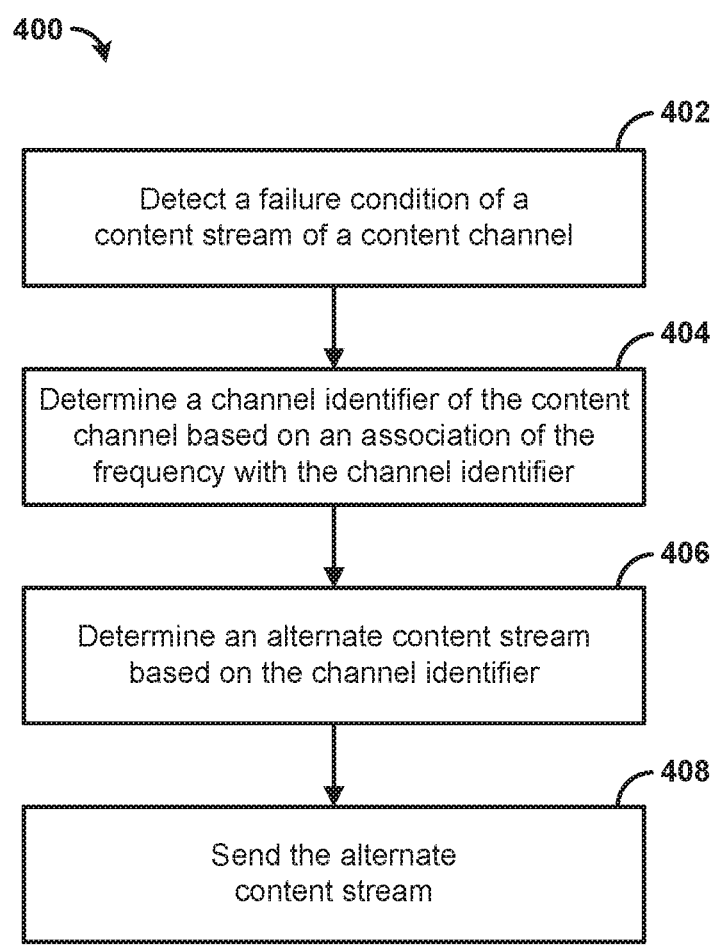

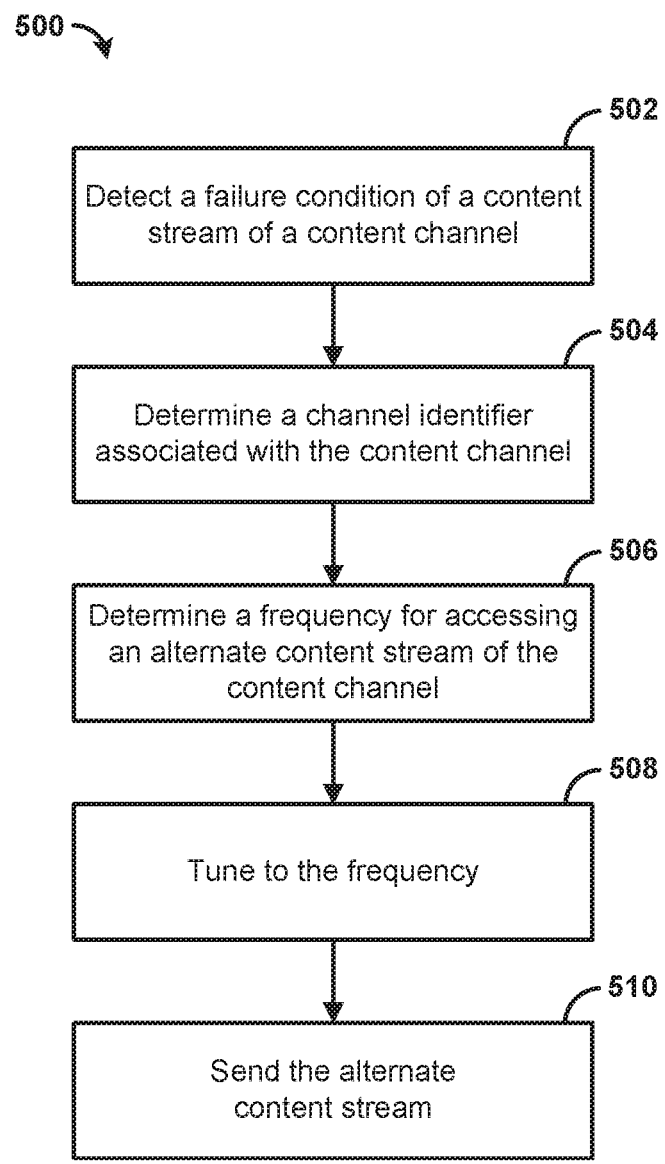

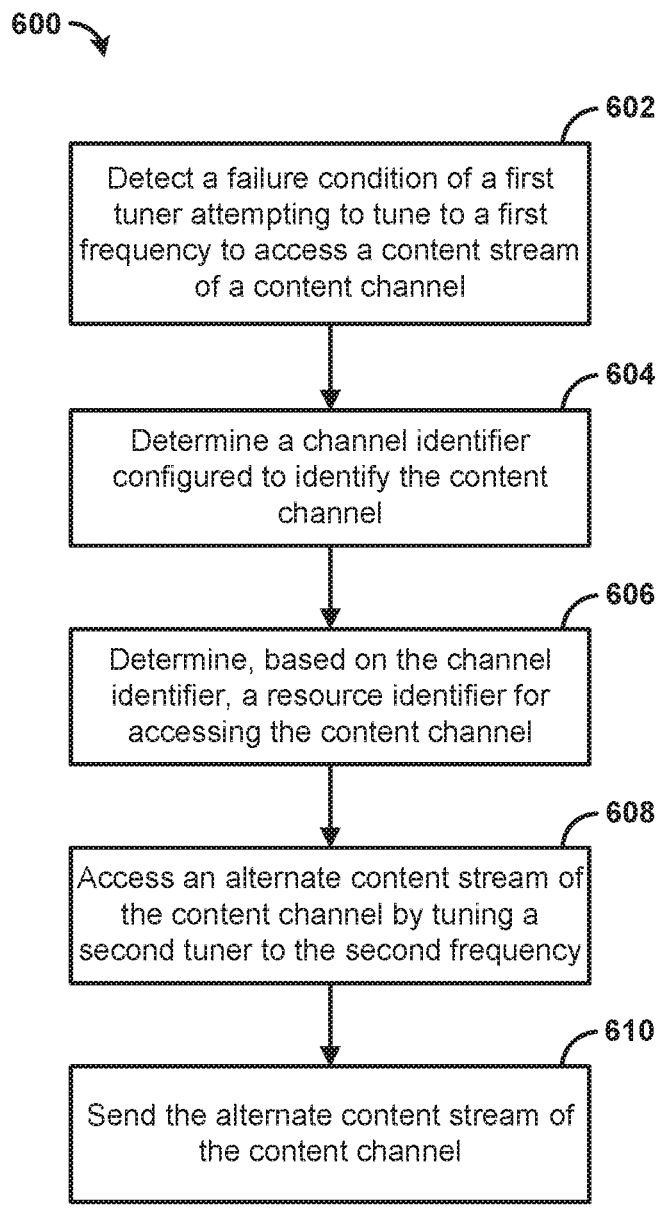

METHODS AND SYSTEMS FOR PROVIDING ALTERNATE CONTENT

BACKGROUND

As network infrastructure continues to expand and change, devices may access content via a variety of network paths. If a problem arises in accessing content, a user device may provide an error message or default to the last content requested by a user. Though content may be available via an alternate route, the user device is unable to recognize and utilize the alternate route. Thus, there is a need for more sophisticated methods and systems for accessing content via alternative routes.

SUMMARY

It is to be understood that the following summary is exemplary and explanatory only and are not restrictive. Methods and systems for providing alternate content streams are disclosed. An example system can comprise a device configured to provide content to a user. If a content stream of a specific content channel is unavailable, the device can detect a failure condition and determine an alternate route for accessing the content channel. For example, the device can be a user device, such as a set top box or other device with one or more tuners. The device can access the content channel by analyzing one or more channel maps associating a channel identifier of the channel with other relevant information such as frequency information, stream identifiers, resource identifiers (e.g., indicating a network address, a protocol, and/or a directory location information). For example, a frequency or resource identifier for accessing the content channel can be determined by identifying the channel identifier associated with the failing network route and using the channel identifier to determine alternate routes for accessing the content. The alternate route is not limited to a particular network or protocol. For example, the alternate content stream can be provided and/or accessible via a non-packet-switched network even though the failing content stream is provided and/or accessible via a packet-switched network. The alternate content stream can be provided and/or accessible via a packet-switched network even though the failing content stream is provided and/or accessible via a non-packet-switched network. Additionally, a different tuner can be used to access the alternate content stream than the tuner used to access the failing content stream.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show embodiments and together with the description, serve to explain the principles of the methods and systems:

FIG. 3A is a diagram of an example first channel map:

FIG. 3B is a diagram of an example second channel;

FIG. 4 is a flowchart of an example method for providing content;

FIG. 5 is a flowchart of another example method for providing content:

FIG. 6 is a flowchart of an yet another example method for providing content.

DETAILED DESCRIPTION

Figure 1:
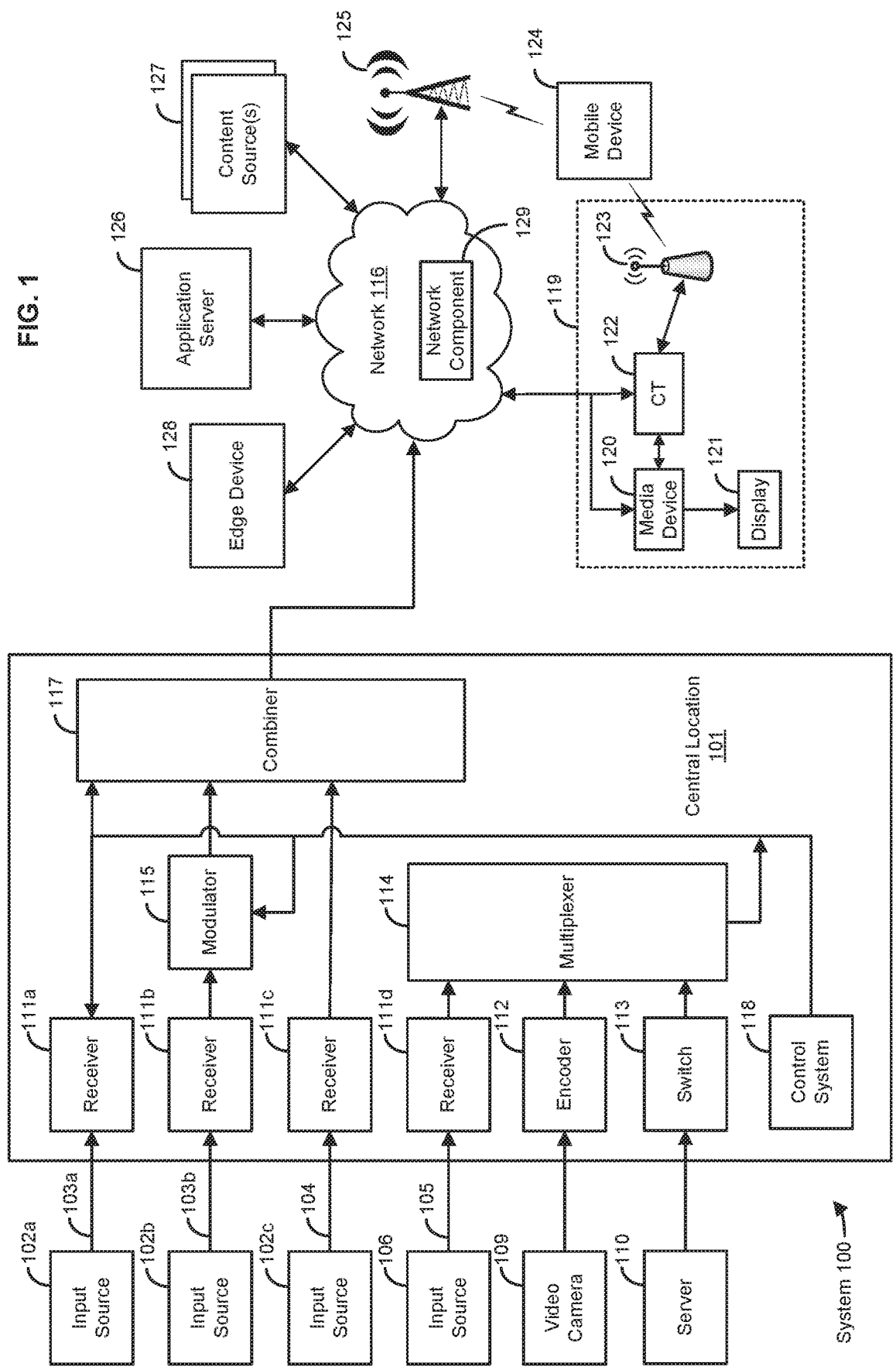
FIG. 1 is a block diagram of an example system for providing content.

Before the present methods and systems are disclosed and described, it is to be understood that the following detailed description along with the methods and systems disclosed are exemplary and not restrictive. The present methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. If such a range is expressed, another embodiment includes from the one particular value and/or to the other particular value. Similarly, if values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart diagrams of methods, systems, apparatuses and computer program products. It will be understood that each block of the block diagrams and flowchart diagrams, and combinations of blocks in the block diagrams and flowchart diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart diagrams support combinations of means for performing the specified functions, combinations of steps for performing the specified functions and program instruction means for performing the specified functions. It will also be understood that each block of the block diagrams and flowchart diagrams, and combinations of blocks in the block diagrams and flowchart diagrams, can be implemented by special purpose hardware-based computer systems that perform the specified functions or steps, or combinations of special purpose hardware and computer instructions.

The present disclosure relates to providing content. Specifically, the present disclosure relates to providing alternate content streams for a particular content channel if a failure condition is detected for the current content stream.

A device can be configured to failover from a content stream of a channel to an alternate content stream of the same channel. For example, if the device (e.g., customer premises equipment) is instructed to tune to a content stream (e.g., NHL Network HD) of a QAM based content stream (e.g., via a non-packet-switched network), the device can access a first channel map (e.g., program table). The first channel map can indicate that content stream is on a virtual channel (e.g., the "channel" the customer sees, such as 858). The first channel map can also comprise a specific frequency (e.g., 857 Mhz), and a stream identifier (e.g., such as MPEG #18). The first channel can also comprise a channel identifier configured to identify a channel (e.g., NBC). The device can tune to the specific frequency and process a content stream at the frequency associated with the stream identifier to display the content stream to a user. The device can also store a second channel map (e.g., a program guide) for accessing content streams via an IP based network. The second channel map can comprise the channel identifier (e.g., or source ID) associated with a resource identifier for accessing the content.

If the device is unable to acquire the content stream for any reason (e.g., MPEG value does not exist, no data on the frequency, etc.), the default behavior of the device is to either render an error message, such as "One Moment Please" or revert back to the last good channel the device was able to display and tell the user that the device was unable to tune to the channel requested by the user. The present methods and systems, however, configure the device to determine an alternate content stream and/or alternate network route for accessing the programming provided on a content channel. The device can use a common identifier, such as the channel identifier, to search the first channel map and/or the second channel map to identify alternate content streams associated with the same channel identifier.

FIG. 1 shows various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system or a network 116.

In an aspect, the central location 101 can receive content from a variety of sources 102a. 102b. 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet-switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communication terminal 122 can comprise a modem (e.g., cable modem), a router, a gateway, a switch, a network terminal (e.g., optical network unit), and/or the like. The communication terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communication terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet-switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

In an exemplary embodiment, the methods and systems disclosed can be located within the media device 120, the communication terminal 122, the mobile device 124, and/or other device within the network 116. For example, the media device 120 can be configured to access content from the content sources 127, the application device 126, the edge device 128, and/or the central location 101. The media device 120 can be configured to access content streams based on a frequency, a resource identifier (e.g., network address, protocol, directory location), and/or other information. The media device 120 can detect a failure condition indicative of failure to access a first content stream above a threshold quality level. The media device 120 can determine an alternate stream for accessing the same content programming as provided on the first content stream. For example, the first content stream can be associated with a channel identifier. The channel identifier can identify a content channel of the content stream.

The system 100 can be configured to provide the content channel via a variety of network routes, such as via a packet-switched network (e.g., Internet protocol network) and/or via a non-packet-switched network (e.g., a network that provides content streaming directly via quadrature amplitude modulation, such as a cable television delivery network). The media device 120 can access one or more channel maps to determine one or more alternate content streams. For example, a first channel map associated with a non-packet-switched network can be analyzed to determine a channel identifier of the first content stream. Then, a second channel map associated with a packet-switched network can be analyzed to determine a frequency or resource identifier for accessing alternate content streams of the same content channel. It should be appreciated, however, that the first channel map and the second channel map can implemented as data structure, such as a single channel map or database (e.g., local or remote database).

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

The output of a single MPEG audio and/or video coder is called a transport stream comprised of one or more elementary streams. An elementary stream is an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs and their associated PESs can be multiplexed into a multi program transport stream. A multi program transport stream has a program clock reference (PCR) mechanism that allows transmission of multiple clocks, one of which is selected and regenerated at the decoder.

A multi program transport stream is more than just a multiplex of audio and video PESs. In addition to the compressed audio, video and data, a transport stream includes metadata describing the bit stream. This includes the program association table (PAT) that lists every program in the multi program transport stream. Each entry in the PAT points to a program map table (PMT) that lists the elementary streams making up each program. Some programs will be unencrypted, but some programs may be subject to conditional access (encryption) and this information is also carried in the metadata. The transport stream can be comprised of fixed-size data packets, for example, each containing 188 bytes. Each packet can carry a program identifier code (PID). Packets in the same elementary stream can all have the same PID, so that the decoder (or a demultiplexer) can select the elementary stream(s) it wants and reject the remainder. Packet continuity counts ensure that every packet that is needed to decode a stream is received. A synchronization system can be used so that decoders can correctly identify the beginning of each packet and deserialize the bit stream into words.

A content item, such as a program, can be a group of one or more PIDs that are related to each other. For instance, a multi program transport stream used in digital television might contain three programs, to represent three television channels. Suppose each channel consists of one video stream, one or two audio streams, and any necessary metadata. A receiver wishing to tune to a particular "channel" merely has to decode the payload of the PIDs associated with its program. It can discard the contents of all other PIDs.

The multi program transport stream carries many different programs and each may use a different compression factor and a bit rate that can change dynamically even though the overall bit rate stays constant. This behavior is called statistical multiplexing and it allows a program that is handling difficult material to borrow bandwidth from a program handling easy material. Each video PES can have a different number of audio and data PESs associated with it. Despite this flexibility, a decoder must be able to change from one program to the next and correctly select the appropriate audio and data channels. Some of the programs can be protected so that they can only be viewed by those who have paid a subscription or fee. The transport stream can comprise Conditional Access (CA) information to administer this protection. The transport stream can comprise Program Specific Information (PSI) to handle these tasks.

Figure 2:
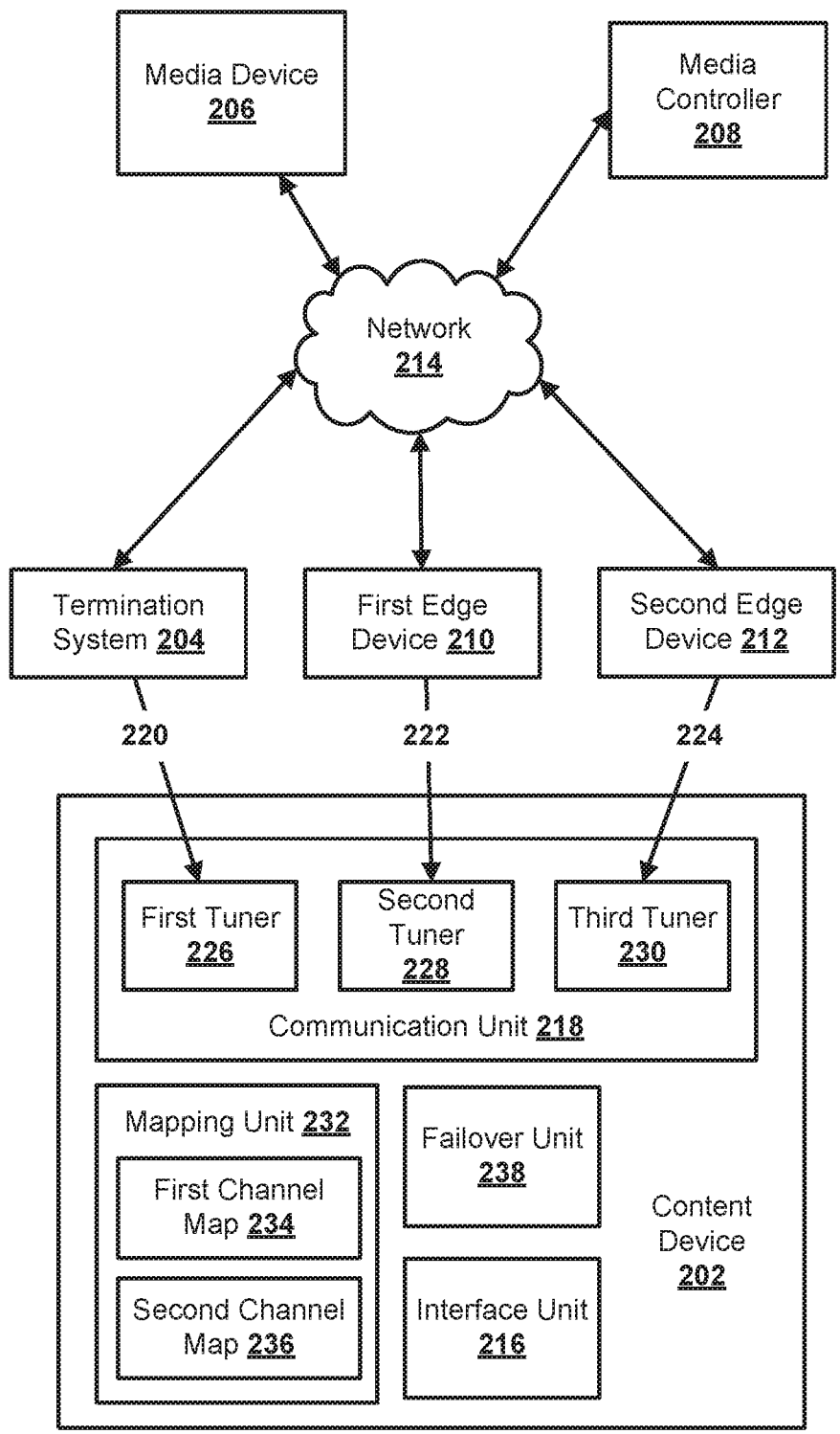
FIG. 2 is a block diagram of an another example system for providing content.

FIG. 2 is a block diagram of an example system 200 for providing alternate content. The system 200 can be configured to provide information, such as content (e.g., video, audio, text, applications, web data) to users. The system 200 can comprise a plurality of devices, such as a content device 202, a termination system 204, a media device 206, a media controller 208, a first edge device 210, a second edge device 212, and/or the like. The plurality of devices (e.g., or a portion thereof) can be implemented as a single device (e.g., via a converged access platform) or as multiple devices. In an aspect, the plurality of devices can implement a content access network and/or content delivery network for a service provider and/or content provider.

For example, system 200 can comprise a network 214. The network 102 can comprise a packet-switched network (e.g., internet protocol based network), a non-packet-switched network (e.g., quadrature amplitude modulation based network), and/or the like. The network 214 can comprise network adapters, switches, routers, modems, and the like connected through wireless links (e.g., radio frequency, satellite) and/or physical links (e.g., fiber optic cable, coaxial cable, Ethernet cable, or a combination thereof). The network 214 can comprise public networks, private networks, wide area networks (e.g., Internet), local area networks, and/or the like. The network 214 can comprise a content access network, content distribution network, and/or the like. In one aspect, the network 214 can be configured to provide communication from telephone, cellular, modem, and/or other electronic devices to and throughout the system 200. For example, the network 214 can be configured to communicatively couple one or more of the content device 202, the termination system 204, the media device 206, the media controller 208, the first edge device 210, the second edge device 212, and/or the like.

The content device 202 can be a user device. The content device 202 can be configured to provide content, services, information, applications, and/or the like to one or more users. For example, the content device 202 can be configured to receive content (e.g., video, audio, applications, text, web pages, social media) for one or more users. The content device 202 can comprise a computer, a smart device (e.g., a smart phone, a smart watch, smart glasses, smart apparel, a smart accessory), a laptop, a tablet, a set top box, a display device (e.g., a television, a monitor), a digital streaming device, a proxy, a gateway, a transportation device (e.g., an on-board computer, a navigation system, a vehicle media center), sensor node, and/or the like.

In one aspect, the content device 202 can comprise an interface unit 216 configured to provide an interface to a user to interact with the content device 202 and/or remote devices, such as the termination system 204, the media device 206, the media controller 208, the first edge device 210, and/or the second edge device 212. The interface unit 216 can be any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player, application (e.g., web application, mobile application, media device application), and/or the like.

The content device 202 can comprise a communication unit 218. As an example, the communication unit 218 can request or query various files from a local source and/or a remote source. As a further example, the communication unit 218 can transmit and/or receive data to a local or remote device such as the termination system 204, the media device 206, the media controller 208, the first edge device 210, and/or the second edge device 212. The communication unit 218 can comprise hardware and/or software to facilitate communication. For example, the communication unit 218 can comprise one or more of a modem, a transceiver (e.g., wireless transceiver)), a digital-to-analog converter, an analog-to-a digital converter, an encoder, a decoder, a modulator, a demodulator, a tuner (e.g., a QAM tuner, a QPSK tuner), and/or the like. In one aspect, the communication unit 218 can be configured to allow one or more remote devices (e.g., in a local or remote portion of the network 214) to control operation of the content device 202.

The content device 202 can be configured to access the network 214 via a plurality of network paths. For example, the network 214 can comprise a first path 220, a second path 222, and/or a third path 224. The plurality of network paths can comprise one or more frequencies, channels, and/or the like accessible via a single communication resource (e.g., a physical network link, a wireless radio spectrum) or multiple communication resources. For example, the first path 220 can be associated with a first frequency range. Communications using the first path 220 can be sent using one or more frequencies within the first frequency range. The second path 222 can be associated with a second frequency range. Communications using the second path 222 can be sent using one or more frequencies within the second frequency range. The third path 224 can be associated with a third frequency range. Communications using the third path 224 can be sent using one or more frequencies within the third frequency range.

For example, the first path 220 can be used for communications (e.g., content, signaling) based on a version of a Data Over Cable Service Interface Specification (DOCSIS) standard. For example, the first path 220 can be used for communications between the content device 202 and the termination system 204. The termination system 204 can be configured to provide access to a packet-switched network, a label-switched network, and/or other network. For example, the termination system 204 can be configured to provision the content device 202 a network address for communication with devices in the network 214. The termination system 204 can provision an internet protocol address to the content device 202. For example, the termination system 204 can comprise a dynamic host control protocol server for provisioning network addresses. The termination system 204 and/or the content device 202 can be configured to communicate based on the DOCSIS standard. For example, Ethernet frames, network packets (e.g., internet protocol packets) can be encapsulated in DOCSIS frames. The first frequency range can be specified by the DOCSIS standard.

The second path 222 can be used for in-band communications for a content delivery network. The third path 224 can be used for out-of-band communications for the content delivery network. For example, the second path 222 and/or the third path 224 can be used for sending non-packet-switched communications, such as communications using QAM (e.g., for a cable delivery network), QPSK (e.g., for a satellite delivery network), and/or the like.

The content device 202 can be configured to communicate with the first edge device 210 via the second path 222. The content device 202 can be configured to communicate with the second edge device 212 via the third path 224. For example, the first edge device 210 can be configured to provide a plurality of content streams. The plurality of content streams can be encoded (e.g., by the first edge device 210) using MPEG or other similar standard. The second frequency range can be divided into channels in which corresponding streams of the plurality of streams are modulated for transmission to the content device 202. One or more of the plurality of content streams can comprise a stream identifier configured to identify the stream, such as an MPEG number.

The content device 202 can be configured to communicate with the second edge device 212 via the third path 224. For example, the second edge device 212 can be used for out-of-band communications. The second edge device 212 can be configured to provide control information, configuration information, access information and/or the like to the content device 202. For example, the second edge device 212 can send one or more channel maps, such as a first channel map 234 and a second channel map 236, to the content device. The content device 202 can send user data, authentication information, and other information to the second edge device 212 for management of the content device 202 (e.g., and user accounts associated with the content device 202).

The media device 206 can be configured to manage content, such as video, audio, text, application content, and/or the like. The media device 206 can store the content. The media device 206 can encode the content as a plurality of content streams. For example, a content asset (e.g., show, program, movie) can be encoded as a plurality of content streams at different bit rates. The media device 206 can send the content to remote devices, such as the first edge device 210 and the second edge device 212. For example, the content can be sent as the plurality of content streams or as one or more content assets. The first edge device 210 and/or the second edge device 212 can encode, encrypted, and/or modulate the content (e.g., continuously or in response to a request for the content).

The media controller 208 can be configured for management of the content on the media device 205. For example, the media controller 208 can store and/or send information related to the content. The media controller 208 can comprise a program guide (e.g., electronic program guide). The media controller 208 can be configured to store one or more channel maps. The one or more channel maps can be specific to a physical region, an account group (e.g., subscription tier), and/or the like. For example, the one or more channel maps can comprise information for accessing the content. The media controller 208 can send the information related to the content (e.g., channel maps, access information) to the first edge device 210, the second edge device 212, and/or the content device 202. The one or more channel maps can be specific to a particular network route for obtaining the content. The one or more channel maps can specify resource identifiers (e.g., network address, links) for packet-switched network paths. The one or more channel maps can specify frequency information (e.g., frequency for tuning to a signal have content), stream identifiers, and/or other information useful for obtaining the content. The content device 202 can request and/or receive channel maps (e.g., as well as the content) via the first path 220, the second path 222, and/or the third path 224. Example channel maps are shown in FIG. 3A and FIG. 3B and described in more detail herein.

In an aspect, the communication unit 218 can comprise a plurality of tuners, such as a first tuner 226, a second tuner 228, a third tuner 230, and/or the like. The plurality of tuners can be configured for communication of information, such as content. For example, the plurality of tuners can be configured to tune to one or more frequency ranges and use one or more of the first path 220, the second path 222, and/or the third path 224 for communication. For example, the first tuner 226 can be configured to communicate using the DOCSIS standard. The second tuner 228 can be configured for in-band communications (e.g., via a QAM content delivery network). The third tuner 230 can be configured for out-of-band communications. For example, the first tuner 226 can be configured to (e.g., or restricted to) use the first frequency range. The second tuner 228 can be configured to (e.g., or restricted to) use the second frequency range. The third tuner 230 can be configured to (e.g., or restricted to) use the third frequency range. The first tuner 226, the second tuner 228, and/or the third tuner 230 can be reprogrammed to access other frequency ranges. For example, restrictions on frequency ranges can be removed.

The content device 202 can comprise a mapping unit 232. The mapping unit 232 can be configured to determine access information (e.g., source information) for accessing content, content channels, content streams, and/or the like. For example, if a user requests a content channel, the mapping unit 232 can be accessed to determine access information comprising details for accessing the associated content channel. For example, the mapping unit 232 can comprise one or more of the plurality of channel maps, such as a first channel map 234. The first channel map 234 can comprise frequency information associated with corresponding channels for accessing content via a non-packet-switched network. For example, the first channel map 234 can comprise a map for identifying content (e.g., content streams, content channels) available via a non-packet-switched network. The non-packet-switched network can comprise a quadrature amplitude modulation (QAM) based network. The non-packet-switched network can comprise a cable television content delivery network. The first channel map 234 can be used for tuning to channels (e.g., QAM channels) as requested by a user. The first channel map 234 can comprise a plurality of entries. One or more (or each) of the plurality of entries can comprise a virtual channel identifier (e.g., a number for the user, such as any number from 0 to 1000), a frequency (e.g., a center frequency for a signal, or a frequency range of a signal), and/or a content stream identifier (e.g., MPEG number).

The plurality of channel maps can comprise a second channel map 236. The second channel map 236 can comprise resource identifier information associated with corresponding channels for accessing content via a packet-switched network. Resource identifier information can comprise a resource identifier, such as a network address (e.g., Internet Protocol address, media access control (MAC) address), a uniform resource identifier (e.g., hypertext transfer protocol (HTTP) link or identifier), and/or the like. The second channel map 236 can comprise associations between a plurality of resource identifiers (e.g., network addresses) and corresponding channel identifiers. For example, the channel identifier can be associated with a resource identifier for accessing the content channel via the alternate content stream. The second channel map 236 can be used for tuning to channels (e.g., content channels), content streams (e.g., on demand content), and/or the like as requested by a user. The second channel map 236 can comprise a second plurality of entries. One or more (or each) of the second plurality of entries can comprise a virtual channel identifier (e.g., a number for the user, such as any number from 0 to 1000), a resource identifier (e.g., network address), and a channel identifier (e.g., identifying a source or channel).

The first channel map 234 and/or the second channel map 236 can be stored on the content device 202. The first channel map 234 and/or second channel map 236 can periodically (e.g., or upon request or triggering event) be updated by a remote device, such as the media controller 208 and the second edge device 212. For example, the first channel map 234 and/or second channel map 236 can be accessed and/or received from the media controller 208.

The content device 202 can comprise a failover unit 238. The failover unit 238 can be configured to determine a failure condition of (e.g., related to, associated with) a content stream of a content channel. The failover unit 238 can be configured to determine a failure condition specific to a non-packet-switched network. The failure condition can be a failure condition related to and/or associated with accessing content via the second path 222. For example, the failure condition can be related to accessing a content stream at a first frequency associated with the content channel and/or content stream. The first frequency can be a frequency of a QAM based network. For example, the first frequency can be within the second frequency range (e.g., range for in-band QAM content streams).

The failure condition can comprise a failure to tune to the frequency associated with the content channel. The failure condition can comprise a failure to detect a signal, data, and/or other information at the frequency. The failure condition can comprise a failure to detect a content stream identifier. The content stream identifier can identify the content stream and/or the content channel. For example, the content stream identifier can comprise an MPEG number associated with an MPEG content stream. As a further example, a signal (e.g., a data signal, an information stream) detected at the frequency can be analyzed to determine a first content stream identifier. If the content stream identifier does not match a second content stream identifier associated with the content stream and/or content channel, then the failure condition can be detected. The failure condition can comprise a failure to access the content stream above a quality level. For example, the content stream can be analyzed to determine a noise level (e.g., signal to noise ratio), a presence of one or more interfering signals (e.g., constant or recurring within a time period), and/or the like.

The failover unit 238 can be configured to determine a failure condition specific to a packet-switched network. For example, the failure condition can be a failure condition related to and/or associated with accessing content via the first path 220. The failure condition can comprise a failure to access the content stream above a quality level. The quality level can comprise a content resolution, a bit rate, and/or the like. The failure condition can comprise an amount of packet loss within a threshold time. The failure condition can comprise a failure to receive a communication (e.g., a response, an acknowledgement, a data packet) within a threshold time. The failure condition can comprise receiving a content stream that does not match the content channel. For example, detecting the failure condition can comprise analyzing one or more packets, segments, and/or the like. A stream identifier can be determined and compared to information related to the content channel (e.g., a content channel identifier, a content stream identifier associated with the content channel). If the stream identifier does not match (e.g., or does not appear related do) the content channel, then the failure condition can be detected.

The failover unit 238 can be configured to determine an alternate content stream if the failure condition is detected. The alternate content stream can be sent to the user instead of the content stream associated with the failure condition. The alternate content stream can comprise an alternate content stream (e.g., or source, route, path) for accessing the content channel. For example, the content channel can comprise content programming, such as a show, a movie, a live event, a program, a newscast, and/or the like. The content channel can be accessed via a variety of different sources, such as content streams. For example, the content channel can be accessible via the first path 220 and/or the second path 222. The content channel can be accessible in multiple formats (e.g., with corresponding encoding, compression, and/or encryption). For example, the content channel can be accessible in a variety of screen sizes, resolutions, bit rates, and/or the like. The content channel can be accessible in standard definition (e.g., 480p), high definition (e.g., 720p, 1080p), ultra high definition (e.g., 4320p).

Determining an alternate content stream can comprise determining a channel identifier of the content channel. The channel identifier can be determined based on an association of the frequency with the channel identifier. For example, the channel identifier can be determined by retrieving the channel identifier from the first channel map. The failover unit 238 can retrieve the channel identifier based on the frequency used to access the content stream (e.g., if the content stream was accessed via a non-packet-switched network). The channel identifier can be associated with a resource identifier (e.g., network address). For example, the channel identifier can be retrieved from the second channel map 236. The failover unit 238 can retrieve the channel identifier based on the resource identifier used to access the content stream (e.g., if the content stream was accessible via a packet-switched network).

In an aspect, the failover unit 238 can be configured to determine the alternate content stream based on a prioritization criterion. For example, the failover unit 238 can rank (e.g., score) potential alternative content streams based the prioritization criterion. High definition can be prioritized above standard definition, or vice versa. Content accessible via a packet-switched network can be prioritized above content streams accessible via a non-packet-switched network. The prioritization criterion can be based on a user setting, viewing history, and/or the like. As an example, the failover unit 238 can identify a standard definition IP stream, a standard definition QAM stream, and a high definition QAM stream as alternate content streams. Based on the prioritization criterion, the failover unit 238 can select the high definition QAM stream as the alternate content stream.

The failover unit 238 can instruct the communication unit 218 to tune to or otherwise request the alternate content stream (e.g., instead of the content stream associated with the failure condition). The alternate content stream can be sent (e.g., to the user without substantial interruption (e.g., no perceived interruption by the user, no interruption greater than a quality threshold) of the content programming (e.g., between detecting the failure condition and transmitting the alternate content stream to the user). For example, if the user is watching a show (e.g., or other content programming), the show can be provided to the user from an alternate source. The show can be provided in the same format (e.g., bit rate, resolution) or an alternate format. For example, a standard definition content stream can be provided instead of a high-definition content stream (e.g., showing the same programming from the content channel), or vice versa. The content channel can be provided via an IP network (e.g., DOCSIS based connection) instead of a QAM network, or vice versa.

The following are examples of implementations of the system 200. It should be noted that, though specific devices are mentioned, it is contemplated that the disclosed examples can be performed by any computing device, such as a network device. The following examples are put forth so as to provide those of ordinary skill in the art with a complete disclosure and description of how the devices and/or methods claimed herein are made and operate, and are intended to be purely exemplary and are not intended to limit the scope of the methods and systems. In an example system, the content device 202 can comprise a QAM tuner and a DOCSIS tuner. The QAM tuner can be configured to tune to frequencies associated with QAM delivery of content (e.g., with a non-packet-switched network). The DOCSIS tuner can be configured to tune frequencies associated with the DOCSIS standard. In some implementations, a general purpose tuner can be used for both QAM and DOCSIS tuning.

The content device 202 can receive information, such as conditional access information, channel map information, and/or the like via DOCSIS. For example, the DOCSIS tuner can communicate with the termination system 204 (e.g., a CMTS in a headend) to receive command and control information. For example, the media controller 208 (e.g., a video controller) can send the command and control information to the termination system 204, and the termination system 204 can send the command and control information to the content device 202. The command and control information can comprise a IP channel map (e.g., packet-switched access channel map, DOCSIS channel map, URI channel map, URL channel map). The IP channel map can comprise a virtual channel number (e.g., what a customer sees, channel 805, 806, etc). The IP channel map can comprise an indication of what sources are available for content associated with the virtual channel number. For example, if a customer requests a channel (e.g., channel 805), the content device 202 can access the IP channel map to determine that the channel can be accessed via a URI (e.g., http://mycdn/company/video/NBCHDx, where 'x' indicates any additional characters). The IP channel map can also comprise a unique identifier for the channel. As an example, a number or other character string, such as 12345, can be an identifier for NBCHD (e.g., high definition channel of NBC). The same identifier can be associated (e.g., assigned to) with standard definition stream of the NBC channel. Such identifier can be a channel identifier (e.g., or source identifier, indicating the source of content, such as NBC). The channel identifier can be unique to the channel or source of the channel. The channel identifier, however, may be associated with many different content streams used to provide the same content (e.g., in different formats, etc). For example, the content streams can provide the same content programming at the same time. The content streams may be accessible from different network paths, frequencies, tuners, and/or the like. Each of the content streams can be associated with unique stream identifiers.

In some scenarios, the stream identifiers can comprise the channel identifier. The channel identifier can be accessed by parsing the stream identifier. For example, a predetermined number of characters can be determined (e.g., extracted) from a content stream. Parsing can comprise determining a flag, a starting character, an ending character, and/or the like (e.g., indicating the start and/or end of the channel identifier). Parsing can also comprise detecting a change in case (e.g., from uppercase to lowercase or lowercase to uppercase), detecting a change in character type (e.g., change from number to letter, letter to number, symbol to number, number to symbol, letter to symbol, and/or symbol to letter), and/or other information.

The content device 202 can also receive a QAM channel map (e.g., non-packet-switched access channel map). The QAM channel map can comprise the virtual channel number (e.g., 805), with the same channel identifier (e.g., 12345). Instead of having a URI as a source for the channel, the QAM channel map can comprise a specific frequency, an MPEG number, and/or that like that is carrying the alternate content stream. The QAM channel map and conditional access information can also be sent from the media controller 208 (e.g. a video controller) to the content device 202. For example, the media controller 208 can send the QAM channel map and conditional access information through the second edge device 212. The second edge device 212 can comprise an edge QAM device (e.g., an edge out-of-band QAM) that can communicate with the content device 202 via a downstream data channel. The downstream data channel can utilize out-of-band frequencies (e.g., the third path 224) for sending data to the content device 202.

The IP channel map and/or the QAM channel map can be provided to or received at the content device 202 by default. In some cases, the content device 202 may request the IP channel map and/or QAM channel map. For example, the content device 202 can be configured to use only QAM or IP as a default. In cases of failure of a channel, a network, a network path (e.g., the first path 220, the second path 222, the third path 224), a content stream, and/or the like, the content device 202 can request the IP channel map and/or QAM channel map. The content device 202 can be configured to reprogram one or more tuners to tune to both IP channels (e.g., via frequencies associated with DOCSIS based communication) and QAM channels. The content device 202 can be configured to reprogram one or more tuners to access IP channels instead of QAM channels and/or reprogram one or more tuners to tune from QAM channels to IP channels.

As previously described, both the QAM channel map and the IP channel map can comprise the same channel identifier (e.g., or source identifier). For example, NBCHD can have the channel identifier of "12345" in both the IP channel map and the QAM channel map. Thus, for example, even if NBCHD is associated with channel 805 in an IP channel map and channel 905 in a QAM channel map, the content device 202 can be configured to access the channel based on either map using the same channel identifier.

As a further example, an IP video customer with a set top box (e.g., content device 202) can request to tune to NBCHD (e.g., by typing in "805" or speaking "NBCHD" into a voice remote). The set top box can access the IP channel map and determine that channel 805 is associated with a URI (e.g., http://mycdn/company/video/NBCHDx) and a channel ID of "12345." The set top box can attempt to access the content using the URI but a failure condition is detected. Instead of going back to the last known good channel, the set top box can inspect the QAM channel map (e.g., which the set top box can get through a legacy QAM or out-of-band tuner). In some scenarios, several channel maps can be broadcast by a provider. The set top box can be also notified during a provisioning process of which QAM channel map to request. As another example, information from the QAM channel map can be stored in the IP channel map. For example, the information from the QAM channel map can be stored as special channels in the IP channel map that are hidden from the user (e.g., not shown or filtered out by an electronic program guide accessed by the user). For example, the IP channel map can comprise electronic program guide data. The electronic program guide data can be used for displaying program information (e.g., a list of content channel and available programs) to users using an application (e.g., electronic program guide.

After the set top box determines the channel identifier (e.g., using the QAM channel map or the IP channel map), the set top box can use the channel identifier for the content stream it failed to access (e.g., via a tuning failure or other network conditions) to perform a lookup for another content stream of the channel. If the set top box does not find a content stream associated with the channel identifier, then the set top box can use an alternate failover process, such as fall back to the last good channel or show an error. However, if the channel identifier is in the QAM channel map, then the set top box can look up the frequency and MPEG ID from the QAM channel map and instruct a tuner, such as a video QAM tuner, to tune to and route a signal on the channel to the output (TV). In such scenario, the customer continues to be presented the channel the customer tuned to, but the customer is receiving the content from an alternate delivery path (e.g., QAM instead of DOCSIS IP video).

In some scenarios, the set top box can be configured to perform additional authorization to failover from a QAM channel to an IP channel, or vice versa. For example, the set top box can be configured to request authentication based on user credentials, a failover code, and/or the like. As a further example, the set top box can request and/or receive temporary authorization based on the failure condition. New and/or additional encryption keys can be issued to the set top box after the authentication. The authorization can later be revoked if the failure condition is detected to no longer be present.

As a further example, the set top box can be configured to determine another channel within the same channel map before analyzing additional channel maps. The set top box can determine whether the channel exists in another content resolution or definition. For example, a standard definition IP can be requested before attempting to access the channel using QAM. As a further example, the channel identifier (e.g., or a broader family identifier) can be used to identify channels having the same content but with different resolutions, bit rates, definitions, and/or the like. As another example, additional information can be placed in a channel map, such as a failover identifier or other identifier associating the channels together.

In another aspect, the present methods and systems can also comprise dynamically providing a content stream via a non-packet-switched network (e.g., QAM network). For example, a failure to access a content stream above a quality level via a first network (e.g., or a first frequency) can be detected. One more of the first edge device 210, the second edge device 212, the termination system 204, the media controller 208, and/or the media device 206 can coordinate to provide (e.g., make available) the content stream via a second network (e.g., or a second frequency). For example, a frequency and/or network with available bandwidth for carrying the channel can be selected. A bandwidth required for carrying the content stream can be determined based on network conditions, streaming history (e.g., of the content device), a prior request for the content stream, characteristics of the content stream (e.g., a bit rate, a resolution), and/or the like. The content device 202 can be notified that the content stream is available via the second network (e.g., or the second frequency). For example, a frequency, a channel, a program identifier, and/or the like can be provided to the content device (e.g., from any of the devices in the system 200). The content device 202 can tune to the second network (e.g., or the second frequency) and receive the content stream. As an example, a failure can be detected related to receiving the content stream as a video on demand file or live content stream via the first network (e.g., the packet-switched network, via the first path 220). The content device 202 can notify the media control 208, the media device 206, the first edge device 210, and/or the second edge device 212 of the failure. The media controller 208 (e.g., or other device in the system 200) can select the second network. The media controller 208 can select and/or specify a channel of the second network. The channel (e.g., or frequency, frequency range) can comprise a channel of a QAM network, such as an in band channel or out of band channel. The content stream can then dynamically be provided (e.g., transmitted to the content device 202) via the specified channel, network, and/or frequency by at least temporarily configuring one or more devices (e.g., the first edge device 210 or any other device in the system 200) to provide the content stream via the specified channel, network, and/or frequency.

As another example, the content device 202 can detect a failure on the second network (e.g., the QAM network). The failure can comprise a failure to provide and/or receive a content stream via a first channel of the second network (e.g., above a threshold quality level). The content device 202 can receive an instruction (e.g., from the media controller 208) to tune to a second channel of the second network. The content stream can be dynamically provided (e.g., the content stream can be transmitted, modulated, encoded, and/or the like on the second channel in response to the failure of the content and/or an instruction from a device, such as the media controller 208) via the second channel. For example, the second channel can be selected based on one or more of available bandwidth, designation as a failover or alternate channel, association of the second channel with a user detecting the failure, and/or the like.

FIG. 3A is a diagram of an example first channel map 234 for a non-packet-switched network. For example, the first channel map 234 can be configured for accessing a stream via a QAM based delivery network. The first channel map 234 can comprise a plurality of entries. An example entry 302 can comprise a virtual channel 304 representing a channel displayed to a user. The entry 302 can comprise a frequency 306 for accessing a content stream and/or channel. For example, a signal can be provided within a frequency range associated with the QAM based delivery network. The entry 302 can comprise an MPEG number 308 (e.g., or other identifier of an encoded stream). The entry 302 can comprise a channel identifier 310 configured to identify a content channel, a content source, and/or the like. For example, the content channel can comprise content programming (e.g., linear content programming) that can be accessed via one or more content streams. The content identifier can be used to identify streams of a content channel having the same resolution, format, and/or the like (e.g., but available via different network paths). The content identifier (e.g., or family identifier) can be used to identify streams of a content channel having the same content programming but in a different resolution, format, and/or the like (e.g., but available via different network paths). In some scenarios, a family identifier can be used to identify a entity (e.g., content provider) associated with and/or providing one or more content channels and/or content streams.

FIG. 3B is a diagram of an example second channel map 236 for a packet-switched network. For example, the second channel map 236 can be configured for accessing a stream via an IP based network. The second channel map 236 can comprise a plurality of entries. An example entry 312 can comprise a virtual channel 304 representing a channel displayed to a user. The entry 312 can comprise a resource identifier 314, such as uniform resource identifier, uniform resource link, and/or the like. For example, the resource identifier 314 can comprise an address, a protocol, a directory structure, and/or other information for accessing a resource, such as a content stream (e.g., some or all of which can be joined as a single string of characters). The entry 312 can comprise a channel identifier 310 configured to identifier a content channel, a content source, and/or the like.

FIG. 4 is a flowchart of an example method for providing content. At step 402, a failure condition of (e.g., related to, associated with) a content stream of a content channel can be detected. The content stream can be provided (e.g., previously and/or currently provided) at a frequency of a first network (e.g., a frequency of a physical layer of the network). The network can comprise a non-packet-switched network, a quadrature amplitude modulation based network, a phase shift keyed network, and/or the like. For example, network can comprise a cable delivery network (e.g., configured to deliver content). Detecting the failure condition of the content stream of the content channel can comprise detecting a failure to tune to the frequency associated with the content channel. Detecting the failure condition of the content stream of the content channel can comprise detecting a failure to detect a signal, data, and/or other information at the frequency. Detecting the failure condition can also comprise detecting a failure to detect a content stream identifier. The content stream identifier can identify the content stream and/or the content channel. For example, the content stream identifier can comprise an MPEG value associated with an MPEG content stream. As a further example, a signal (e.g., a data signal, an information stream) detected at the frequency can be analyzed to determine a first content stream identifier. If the content stream identifier does not match a second content stream identifier associated with the content stream and/or content channel, then the failure condition can be detected. Detecting the failure condition of the content stream of the content channel can also comprise detecting a failure to access the content stream above a quality level. For example, the content stream can be analyzed to determine a noise level (e.g., signal to noise ratio), a presence of one or more interfering signals (e.g., constant or recurring within a time period), and/or the like.

At step 404, a channel identifier of the content channel can be determined. The channel identifier can be determined based on an association of the frequency with the channel identifier. Determining the channel identifier can comprise retrieving the channel identifier from a first channel map. The first channel map can comprise frequency information associated with corresponding channels for accessing content via the first network (e.g., the non-packet-switched network). For example, the non-packet-switched network can comprise the QAM based network. The QAM based network can comprise a cable television content delivery network. The first channel map can be used for tuning to channels (e.g., QAM channels) as requested by a user. The first channel map can comprise a plurality of entries. One or more (or each) of the plurality of entries can comprise a virtual channel identifier (e.g., a number presented to the user, such as any number from 0 to 1000), a frequency (e.g., a center frequency for a signal, or frequency range of a signal), and a content stream identifier (e.g., MPEG number). The first channel map can be accessed from local storage. For example, the first channel map can be stored on a device, such as a set top box, a digital streaming device, a television, and/or the like. The first channel map can be accessed and/or received from a remote device. For example, the device can receive the first channel map (e.g., periodically, upon request).

At step 406, an alternate content stream can be determined based on the channel identifier. The alternate content stream can be accessible via a second network. The alternate content stream can be accessible as an alternative for accessing the content channel. The second network can comprise a packet-switched network. The second network and the first network can share one or more communication links (e.g., wired or wireless physical links, network links, and/or the like), communication mediums, and/or the like. For example, the first network can be implemented by a first network protocol (e.g., a non-packet-switching protocol). The second network can be implemented by a second network protocol (e.g., a packet-switching protocol, such as a DOCSIS based protocol). As another example, the first network can use a first frequency range, a first group of time slots, and/or the like of the physical link. The second network can use a second frequency range, a second group of time slots, and/or the like of the physical link. In some implementations, the second network and first network can be implemented as separate physical networks. For example, the first network can be the cable delivery network, and the second network can be a wireless network (e.g., such as a WiFi network, a cellular network, and/or the like). The alternate content stream can provide an alternate route for accessing the content channel. Determining the alternate content stream based on the channel identifier can comprise retrieving a network address (e.g., or other resource identifier) for accessing the alternate content stream. For example, the packet-switched network can comprise an internet protocol based network. The network address can comprise an internet protocol address, a hypertext transfer protocol based identifier, a media access control (MAC address), and/or the like.

The network address can be retrieved from a second channel map. The second channel map can comprise associations between a plurality of network addresses and corresponding channel identifiers. The channel identifier can be associated with both a network address for accessing the content channel via the alternate content stream.

The second channel map can be used for tuning to channels (e.g., content channels), content streams (e.g., on demand content), and/or the like as requested by a user. The second channel map can comprise a second plurality of entries. One or more (or each) of the second plurality of entries can comprise a virtual channel identifier (e.g., a number for the user, such as any number from 0 to 1000), a resource identifier (e.g., network address), and a channel identifier (e.g., identifying a source or channel). The second channel map can be accessed from local storage. For example, the second channel map can be stored on the device. The second channel map can be accessed and/or received from a remote device. For example, the device can receive the second channel map (e.g., periodically, upon request).

At step 408, the alternate content stream can be sent (e.g., provided, transmitted, displayed). For example, the alternate content stream can be sent to a user. The alternate content stream can be sent to the user from the device. The device can comprise a plurality of tuners, such as the first tuner and the second tuner. For example, the content stream can be accessible and/or accessed via the first tuner of the device. The alternate content stream can be accessible and/or accessed via a second tuner of the device. The first tuner can be configured to tune to frequencies within the first frequency range. The first frequency range can be associated with the non-packet-switched network, such as the quadrature amplitude modulation network. The QAM network can comprise a QAM content delivery network. The QAM network can provide a plurality of content channels. Each content channel can be provided via a corresponding signal within a frequency range (e.g., allotted to, associated with the channel). The device can also comprise a second tuner. The second tuner can be configured to tune to frequencies within the second frequency range. The second frequency range can be associated with a packet-switched network. For example, the second frequency range can be associated with a DOCSIS based network connection. For example, the second frequency range can be used for establishing a network connection (e.g., a DOCSIS based network connections). The network connection can comprise a connection between the device and a termination server (e.g., a cable modem termination system). The termination server can be configured to coordinate a plurality of network connections between devices and the termination server using frequencies within the second frequency range.

In an aspect, the content channel can comprise content programming. The content programming can be sent, transmitted, provided, and/or presented to the user without substantial interruption (e.g., no perceived interruption by the user, no interruption greater than a quality threshold) between detecting the failure condition and transmitting the alternate content stream to the user. For example, if the user is watching a show (e.g., or other content programming), the show can be provided to the user from an alternate source. The show can be provided in the same format (e.g., bit rate, resolution) or an alternate format. For example, a standard definition content stream can be provided instead of a high-definition content stream (e.g., showing the same programming from the content channel), or vice versa. The content channel can be provided via an IP network (e.g., a DOCSIS based connection) instead of a QAM network, or vice versa.

FIG. 5 is a flowchart of an example method for providing content. At step 502, a failure condition of (e.g., related to, associated with) a content stream of a content channel can be detected. The content stream can be provided and/or accessible via a first network. The first network can comprise a packet-switched network. Detecting the failure condition of the content stream of the content channel can comprise detecting a failure to access the content stream above a quality level. The quality level can comprise a content resolution, a bit rate, and/or the like. The failure condition can comprise an amount of packet loss within a threshold time. The failure condition can comprise a failure to receive a communication (e.g., a response, an acknowledgement, a data packet) within a threshold time. The failure condition can comprise receiving a content stream that does not match the content channel. For example, detecting the failure condition can comprise analyzing one or more packets, segments, and/or the like. A stream identifier can be determined and compared to information related to the content channel (e.g., a content channel identifier, a content stream identifier associated with the content channel). If the stream identifier does not match (e.g., or does not appear related do) the content channel, then the failure condition can be detected.

At step 504, a channel identifier associated with the content channel can be determined. Determining the channel identifier associated with the content channel can comprise retrieving the frequency from a first channel map. The first channel map can comprise associations between a plurality network addresses and corresponding channel identifiers. The first channel map can be used for tuning to channels (e.g., content channels), content streams (e.g., on demand content), and/or the like as requested by a user. The first channel map can comprise a first plurality of entries. One or more (or each) of the first plurality of entries can comprise a virtual channel identifier (e.g., a number presented to the user, such as any number from 0 to 1000), a resource identifier (e.g., network address), and/or a channel identifier (e.g., identifying a source or channel). The first channel map can be accessed from local storage. For example, the first channel map can be stored on the device comprising the tuner. The first channel map can be accessed and/or received from a remote device. For example, the device comprising the tuner can receive the first channel map (e.g., periodically, upon request).

The channel identifier can be associated with a network address for accessing the content channel via the content stream. For example, the first network (e.g., the packet-switched network) can comprise an internet protocol based network. The network address can comprise an internet protocol address, a hypertext transfer protocol based identifier, a media access control (MAC address), and/or the like.

At step 506, a frequency for accessing, via a second network, an alternate content stream of the content channel can be determined. The second network can comprise a non-packet-switched network, a quadrature amplitude modulation based network, a phase shift keyed network, and/or the like. For example, second network can comprise a cable delivery network (e.g., configured to deliver content). For example, the frequency can be determined based on an association of the channel identifier with the frequency. The channel identifier can be associated with the frequency for accessing the content channel via the alternate content stream. Determining the frequency for accessing, via the second network, the alternate content stream of the content channel based on the association of the channel identifier with the frequency can comprise accessing a second channel map in local storage. The second channel map can comprise frequency information associated with corresponding channels for accessing content via the non-packet-switched network. For example, the non-packet-switched network can comprise the QAM network. The QAM network can comprise a cable television content delivery network. The second channel map can be used for tuning to channels (e.g., QAM channels) as requested by a user. The second channel map can comprise a second plurality of entries. One or more (or each) of the second plurality of entries can comprise a virtual channel identifier (e.g., a number for the user, such as any number from 0 to 1000), a frequency (e.g., center frequency for a signal, or frequency range of a signal), a content stream identifier (e.g., MPEG number), and/or the like. The second channel map can be accessed from local storage. For example, the second channel map can be stored on the device comprising the tuner. The second channel map can be accessed and/or received from the remote device. For example, the device comprising the tuner can receive the second channel map (e.g., periodically, upon request).

The second network and the first network can share one or more communication links (e.g., wired or wireless physical links, network links, and/or the like), communication mediums, and/or the like. For example, the first network can be implemented by a first network protocol (e.g., a packet-switching protocol, such as a DOCSIS based protocol or protocol supported by DOCSIS). The second network can be implemented by a second network protocol (e.g., a non-packet-switching protocol). As another example, the first network can use a first frequency range, a first group of time slots, and/or the like of the physical link. The second network can use a second frequency range, a second group of time slots, and/or the like of the physical link. In some implementations, the second network and the first network can be implemented as separate physical networks. For example, the second network can be the cable delivery network, and the first network can be a wireless network (e.g., such as a WiFi network, a cellular network, and/or the like).

At step 508, the frequency can be tuned to (e.g., by the device). The content stream can be accessible and/or accessed via a first tuner of a device. The alternate content stream can be accessed via a second tuner of the device. The device can comprise a plurality of tuners, such as the first tuner and the second tuner. The first tuner can be configured to tune to frequencies within the first frequency range. The first frequency range can be associated with the first network (e.g., the non packet-switched network, the quadrature amplitude modulation network. The second network can comprise a QAM content delivery network. The second network can provide a plurality of content channels. Each content channel can be provided via a corresponding signal within a frequency range (e.g., allotted to, associated with the channel). The second tuner can be configured to tune to frequencies within the second frequency range. The second frequency range can be associated with a packet-switched network. For example, the second frequency range can be associated with a DOCSIS based network connection. For example, the second frequency range can be used for establishing a network connection (e.g., a DOCSIS based network connections). The network connection can comprise a connection between the device and a termination server (e.g., a cable modem termination system). The termination server can be configured to coordinate a plurality of network connections between devices and the termination server using frequencies within the second frequency range.

At step 510, the alternate content stream can be sent (e.g., to a user) via the second network. The content channel can comprise content programming. The content programming can be sent (e.g., transmitted, provided, presented) to the user without substantial interruption (e.g., no perceived interruption by the user, no interruption greater than a quality threshold) between detecting a failure and sending the alternate content stream to the user. For example, if the user is watching a show (e.g., or other content programming), the show can be provided to the user from an alternate source. The show can be provided in the same format (e.g., bit rate, resolution) or an alternate format. For example, a standard definition content stream can be provided instead of a high-definition content stream (e.g., showing the same programming from the content channel), or vice versa. The content channel can be provided via the second network (e.g., the QAM network) instead of the first network (e.g., an IP network, DOCSIS based connection), or vice versa.

FIG. 6 is a flowchart of an example method for providing content. At step 602, a failure condition of a first tuner attempting to tune to a first frequency to access a content stream of a content channel can be detected. The first tuner can be configured to access content via a quadrature amplitude modulation based network. Detecting the failure condition of the first tuner attempting to tune to the first frequency to the content stream of the content channel can comprise detecting a failure to tune to content at the first frequency. Detecting the failure condition can comprise detecting a failure to detect a signal, data, and/or other information at the frequency. Detecting the failure condition can also comprise detecting a failure to detect a content stream identifier. The content stream identifier can identify the content stream and/or the content channel. For example, the content stream identifier can comprise an MPEG value associated with an MPEG content stream. As a further example, a signal (e.g., a data signal, an information stream) detected at the frequency can be analyzed to determine a first content stream identifier. If the content stream identifier does not match a second content stream identifier associated with the content stream and/or content channel, then the failure condition can be detected. Detecting the failure condition can also comprise detecting a failure to access the content stream above a quality level. For example, the content stream can be analyzed to determine a noise level (e.g., signal to noise ratio), a presence of one or more interfering signals (e.g., constant or recurring within a time period), and/or the like.

At step 604, a channel identifier configured to identify the content channel can be determined based on an association of the first frequency with the channel identifier. Determining the channel identifier can comprise retrieving the channel identifier from a first channel map. The channel identifier can be associated with the first frequency for accessing the content channel via the content stream. The first channel map can comprise frequency information associated with corresponding channels for accessing content via a non-packet-switched network. For example, the non-packet-switched network can comprise the QAM based network. The QAM based network can comprise a cable television content delivery network. The first channel map can be used for tuning to channels (e.g., content channels, QAM channels) as requested by a user. The first channel map can comprise a plurality of entries. The plurality of entries can each comprise a virtual channel identifier (e.g., a number presented to the user, such as any number from 0 to 1000), a frequency (e.g., center frequency for a signal, or frequency range of a signal), and a content stream identifier (e.g., MPEG number). The first channel map can be accessed from local storage. For example, the first channel map can be stored on a device comprising a tuner, such as a set top box, digital streaming device, television, and/or the like. The first channel map can be accessed and/or received from a remote device. For example, the device comprising the tuner can receive the first channel map (e.g., periodically, upon request).

At step 606, a resource identifier for accessing the content channel via a second frequency can be determined based on the channel identifier. Determining, based on the channel identifier, the resource identifier for accessing the content channel via the second frequency can comprise retrieving from a second channel map a network address for accessing the alternate content stream. The second channel map can comprise associations between resource identifiers (e.g., network addresses) and corresponding channel identifiers. The channel identifier can be associated with a network address for accessing the content channel via the alternate content stream.

The second channel map can be used for tuning to channels (e.g., content channels), content streams (e.g., on demand content), and/or the like as requested by a user. The second channel map can comprise a second plurality of entries. One or more (or each) of the second plurality of entries can comprise a virtual channel identifier (e.g., a number for the user, such as any number from 0 to 1000), a resource identifier (e.g., a network address), and a channel identifier (e.g., identifying a source or channel). The second channel map can be accessed from local storage. For example, the second channel map can be stored on the device comprising the tuner. The second channel map can be accessed and/or received from a remote device. For example, the device comprising the tuner can receive the second channel map (e.g., periodically, upon request).

At step 608, an alternate content stream of the content channel can be accessed by tuning a second tuner to the second frequency. The second tuner can be configured to access content via a packet-switched network. The alternate content stream can be accessed using the device. The device can comprise a plurality of tuners, such as the first tuner and the second tuner. The first tuner can be configured to tune to frequencies within a first frequency range. The first frequency can be within the first frequency range. The first frequency and/or the first frequency range can be associated with a quadrature amplitude modulation (QAM) network. The QAM network can comprise a QAM content delivery network. The QAM network can provide a plurality of content channels. Each content channel can be provided via a corresponding signal within a frequency range (e.g., allotted to, associated with the channel). The second tuner can be configured to tune to frequencies within a second frequency range. The second frequency can be within the second frequency ranger. The second frequency and/or the second frequency range can be associated with a packet-switched network. For example, the second frequency range can be associated with a DOCSIS based network connection. For example, the second frequency range can be used for establishing a network connection (e.g., a DOCSIS based network connections). The network connection can comprise a connection between the device and a termination server (e.g., a cable modem termination system). The termination server can be configured to coordinate a plurality of network connections between devices and the termination server using frequencies within the second frequency range.

At step 610, the alternate content stream of the content channel can be sent (e.g., transmitted, provided, presented, displayed). The alternate content stream can be sent to a user. The content channel can comprise content programming. The content programming can be sent to the user without substantial interruption (e.g., no perceived interruption by the user, no interruption greater than a quality threshold) between detecting a failure and transmitting the alternate content stream to the user. For example, if the user is watching a show (e.g., or other content programming), the show can be provided to the user from an alternate source. The show can be provided in the same format (e.g., bit rate, resolution) or an alternate format. For example, a standard definition content stream can be provided instead of a high-definition content stream (e.g., showing the same programming from the content channel), or vice versa. The content channel can be provided via an IP network (e.g., a DOCSIS based connection) instead of a QAM network, or vice versa.

Figure 7:
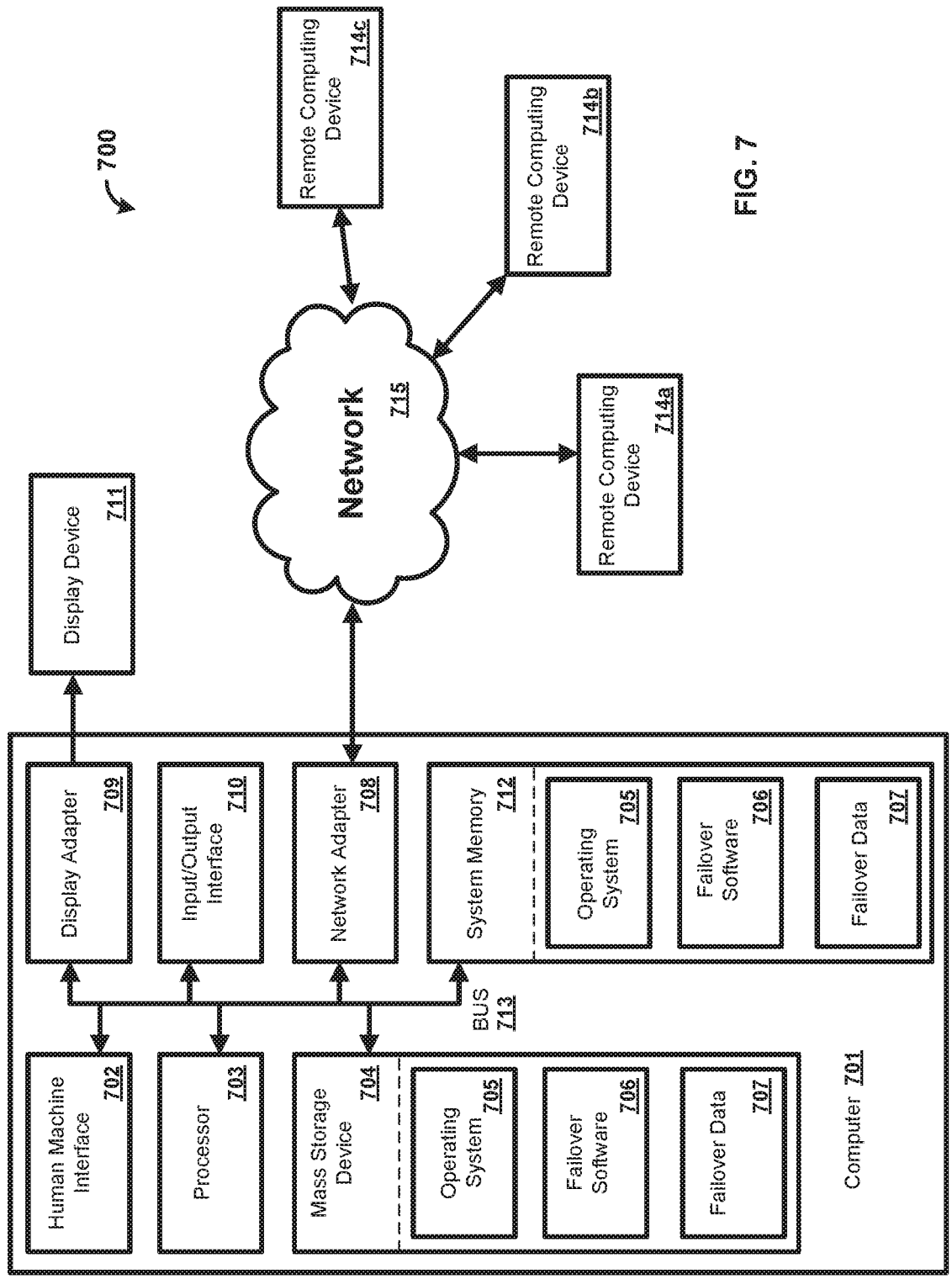
FIG. 7 is a block diagram of an example computing device in which the present method and systems can operate.

In an exemplary aspect, the methods and systems can be implemented on a computer 701 as shown in FIG. 7 and described below. By way of example, the media device 206, the media controller 208, the termination system 204, the first edge device 210, the second edge device 212, and the content device 202 of FIG. 2 can be one or more computers as shown in FIG. 7. Furthermore any of the devices of FIG. 1 can be one or more computers as shown in FIG. 7. Similarly, the methods and systems disclosed can utilize one or more computers to perform one or more functions in one or more locations. FIG. 7 is a block diagram of an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 713, and all buses specified in this description can also be implemented over a wired or wireless network connection and each of the subsystems, including the one or more processors 703, a mass storage device 704, an operating system 705, failover software 706, failover data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the failover data 707 and/or program modules such as the operating system 705 and the failover software 706 that are immediately accessible to and/or are presently operated on by the one or more processors 703.

In another aspect, the computer 701 can also comprise other removable/non-removable, volatile/non-volatile computer storage media By way of example, FIG. 7 shows the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the failover software 706. Each of the operating system 705 and the failover software 706 (or some combination thereof) can comprise elements of the programming and the failover software 706. The failover data 707 can also be stored on the mass storage device 704. The failover data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

By way of example, application programs and other executable program components such as the operating system 705 are shown herein as discrete blocks, although it is recognized that such programs and components reside at various times in different storage components of the computing device 701, and are executed by the one or more processors 703 of the computer. An implementation of the failover software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media" "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM. ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be for purposes of explanation rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, based on an amount of information received from a first transceiver of a device within a time interval not satisfying a threshold, a failure condition of the first transceiver attempting to access a content item via a content stream, wherein the content item is provided at a frequency associated with a quadrature amplitude modulation (QAM) based network;
   determining, based on an association with the frequency, an identifier associated with the content stream;
   determining, based on the identifier, an alternate content stream, wherein the alternate content stream is associated with a packet-switched network; and
   sending, via the packet-switched network, the content item via the alternate content stream, wherein the alternate content stream is accessible via a second transceiver of the device.

2. The method of claim 1, wherein determining the failure condition comprises determining a failure of the first transceiver to access the content item above a quality level within the time interval.

3. The method of claim 1, wherein determining, based on the association with the frequency, the identifier comprises retrieving the identifier from a first channel map, wherein the first channel map comprises information associated with corresponding channels for accessing content via different media.

4. The method of claim 1, wherein the identifier is associated with both the frequency and a network address for accessing the content item via the alternate content stream.

5. The method of claim 1, wherein determining, based on the identifier, the alternate content stream comprises retrieving a network address for accessing the content item from a second channel map, wherein the second channel map comprises associations between a plurality of network addresses and corresponding identifiers.

6. The method of claim 1, further comprising receiving, via the second transceiver, the content item.

7. The method of claim 1, wherein the content stream comprises content programming, and wherein the content programming is presented to a user without substantial interruption between detecting the failure condition and sending, via the packet-switched network, the content item via the alternate content stream.

8. A method, comprising:
   determining, by a device based on an amount of information received from a first transceiver of the device within a time interval not satisfying a threshold, a failure condition of the first transceiver attempting to access a content item via a content stream, wherein the content item is provided via a packet-switched network;
   determining an identifier associated with the content stream;
   determining, based on the identifier, a frequency for accessing, via a quadrature amplitude modulation (QAM) network, an alternate content stream associated with the content item;
   tuning to the frequency; and
   receiving, by a second transceiver of the device via the QAM network, the content item via the alternate content stream.

9. The method of claim 8, wherein determining the failure condition of the first transceiver comprises determining a failure of the first transceiver to access the content item, within the time interval, at a quality level that satisfies a second threshold.

10. The method of claim 8, wherein the identifier is associated with both the frequency and a network address of for accessing the content item via the content stream.

11. The method of claim 8, wherein determining the identifier comprises retrieving the frequency from a channel map, wherein the channel map comprises associations between a plurality network addresses and corresponding identifiers.

12. The method of claim 8, wherein determining, based on the identifier, the frequency comprises accessing a channel map in local storage, wherein the channel map comprises frequency information associated with corresponding channels for accessing content via the non-packet-switched network.

13. The method of claim 8, further comprising causing output of the content item.

14. The method of claim 8, wherein the content stream comprises content programming, and wherein the content programming is presented to a user without substantial interruption between determining the failure condition and receiving the content item via the alternate content stream.

15. A method, comprising:
   determining, by a device based on an amount of information received from a first transceiver of the device within a time interval not satisfying a threshold, a failure condition of the first transceiver attempting to tune to a first frequency to access a content item via a content stream, wherein the first transceiver is configured to access content via a quadrature amplitude modulation (QAM) based network;
   determining a first identifier configured to identify the content stream based on an association of the first frequency with the first identifier;
   determining, based on the first identifier, a second identifier for accessing the content item via a second frequency;
   accessing an alternate content stream by tuning a second transceiver to the second frequency, wherein the second transceiver is configured to access content via a packet-switched network; and receiving, via the alternate content stream, the content item.

16. The method of claim 15, wherein determining the failure condition comprises determining a failure to access the content item, within the time interval, at a quality level that satisfies a second threshold.

17. The method of claim 15, wherein determining the first identifier comprises retrieving the first identifier from a channel map, wherein the channel map comprises frequency information associated with corresponding channels for accessing content items via a non-packet-switched network.

18. The method of claim 15, wherein the first identifier is associated with both the first frequency and a network address for accessing the content item via the alternate content stream.

19. The method of claim 15, wherein determining, based on the first identifier, the second identifier comprises retrieving from a channel map a network address for accessing the content item, wherein the channel map comprises associations between network addresses and corresponding identifiers, wherein the first identifier comprises a channel identifier, and wherein the second identifier comprises a resource identifier.

20. The method of claim 15, wherein the content stream comprises content programming, and wherein the content programming is presented to a user without substantial interruption between determining the failure condition and receiving the content item via the alternate content stream.

* * * * *